US011323410B2

(12) United States Patent
Kant (10) Patent No.: US 11,323,410 B2
(45) Date of Patent: May 3, 2022

(54) METHOD AND SYSTEM FOR SECURE DISTRIBUTION OF MOBILE DATA TRAFFIC TO CLOSER NETWORK ENDPOINTS

(71) Applicant: MAVENIR SYSTEMS, INC., Richardson, TX (US)

(72) Inventor: Nishi Kant, Fremont, CA (US)

(73) Assignee: Mavenir Systems, Inc., Richardson, TX (US)

( * ) Notice: Subject to any disclaimer, the term of this patent is extended or adjusted under 35 U.S.C. 154(b) by 1063 days.

(21) Appl. No.: 15/299,714

(22) Filed: Oct. 21, 2016

(65) Prior Publication Data
US 2017/0127273 A1 May 4, 2017

Related U.S. Application Data

(60) Provisional application No. 62/248,696, filed on Oct. 30, 2015.

(51) Int. Cl.
*G06F 21/00* (2013.01)
*H04L 29/06* (2006.01)
(Continued)

(52) U.S. Cl.
CPC ........ *H04L 61/1511* (2013.01); *H04L 63/029* (2013.01); *H04L 63/0281* (2013.01);
(Continued)

(58) Field of Classification Search
CPC ..... H04W 12/02; H04W 40/20; H04W 88/16; H04W 40/04; H04W 40/36;
(Continued)

(56) References Cited

U.S. PATENT DOCUMENTS 8,554,933 B2 * 10/2013 Delos Reyes ....... H04L 61/1511
709/229
2011/0075675 A1 * 3/2011 Koodli ................... H04L 12/14
370/401
(Continued)

FOREIGN PATENT DOCUMENTS

EP 2171981 A1 * 4/2010 ............ H04W 60/00

OTHER PUBLICATIONS

Arsany Basta, et al., Applying NFV and SDN to LTE Mobile Core Gateways; The Functions Placement Problem, AllThingsCellular '14 Proceedings of the 4th workshop on All things cellular: operations, applications, & challenges pp. 33-38, 2014.*
(Continued)

*Primary Examiner* — Lisa C Lewis
(74) *Attorney, Agent, or Firm* — Ohlandt, Greeley, Ruggiero & Perle, LLP (57) ABSTRACT

When a user equipment (UE) provides a new request to a serving gateway (S GW), the S GW augments domain name system (DNS) requests and provides them to a public DNS, with the augmentation providing indications of the requested function. The public DNS responds by providing the IP address of a simplified packet data network (PDN) gateway (P GW) close to the UE location. The P GW forwards communications to the nearest instance of an endpoint providing the requested service or function. In embodiments, some of the functions of the P GW are shifted to other devices in the mobile core, devices that are already local. The simplification of the P GW allows the P GW to be virtualized and moved to a general-purpose server location. Existing information present in the data path is used to provide encryption of portions of the General Packet Radio Services (GPRS) Tunneling Protocol (GTP) connection,
(Continued)

allowing the location of the P GW to be optimized in a virtual server data center, as the data path is now secure.

24 Claims, 6 Drawing Sheets

(51) Int. Cl.
  *H04L 61/4511* (2022.01)
  *H04W 40/20* (2009.01)
  *H04W 12/03* (2021.01)
  *H04W 12/80* (2021.01)
  *H04W 88/16* (2009.01)

(52) U.S. Cl.
  CPC ........... *H04L 63/306* (2013.01); *H04W 12/03* (2021.01); *H04W 12/80* (2021.01); *H04W 40/20* (2013.01); *H04W 88/16* (2013.01)

(58) Field of Classification Search
  CPC ............. H04W 36/023; H04L 61/1511; H04L 63/306; H04L 63/029; H04L 63/0281
  USPC ........................................................ 380/270
  See application file for complete search history.

(56) References Cited

U.S. PATENT DOCUMENTS

| | | | |
|---|---|---|---|
| 2012/0084449 A1* | 4/2012 | Delos Reyes ....... | H04L 61/1511 709/229 |
| 2012/0275430 A1* | 11/2012 | Wang .................... | H04W 76/25 370/331 |
| 2014/0126538 A1* | 5/2014 | Mihaly ............... | H04W 36/023 370/331 |
| 2014/0241315 A1* | 8/2014 | Niu ...................... | H04L 67/1091 370/331 |
| 2014/0362772 A1* | 12/2014 | Li .......................... | H04W 76/12 370/328 |
| 2017/0026896 A1* | 1/2017 | Enomoto .............. | H04W 40/20 |
| 2017/0195930 A1* | 7/2017 | Tomici .................... | H04W 8/06 |

OTHER PUBLICATIONS

Andreas Baumgartner, et al., Mobile Core Network Virtualization: A Model for combined Virtual Core Network Function Placement and Topology Optimization, IEEE Explore 2015.*
Omar, "APN-FQDN Naming Structure—Omar—Expert Opinion—LTE University", Mar. 12, 2013.*
Stallings, William. Cryptography and Network Security Principles and Practices, Fourth Edition, Prentice Hall (Nov. 16, 2005).*
Arsany Basta, et al., Applying NFV and SDN to LTE Mobile Core Gateways; The Functions Placement Problem, AllThingsCellular '14 Proceedings of the 4th workshop on All things cellular: operations, applications, & challenges pp. 33-38, 2014.*

* cited by examiner

METHOD AND SYSTEM FOR SECURE DISTRIBUTION OF MOBILE DATA TRAFFIC TO CLOSER NETWORK ENDPOINTS

CROSS REFERENCE TO RELATED APPLICATIONS

This application claims the benefit under 35 U.S.C. § 119(e) of U.S. Provisional Patent Application Ser. No. 62/248,696 entitled "Method and System for Secure Distribution of Mobile Data Traffic across Network Endpoints," filed Oct. 30, 2015, which is hereby incorporated by reference as if reproduced in its entirety.

BACKGROUND OF THE INVENTION

1. Field of the Invention

The invention relates to devices in the mobile core.

2. Description of the Related Art

In today's traditional mobile network, a user Internet Protocol (IP) packet from a mobile device first goes to radio towers, i.e. eNodeB (eNB). From there it is tunneled in General Packet Radio Services (GPRS Tunneling Protocol (GTP) format to a serving gateway (S GW). From the S GW the user IP packet is then tunneled again in GTP protocol to a packet data network (PDN) gateway (P GW) before being sent to its destination. In other words, the mobile data traffic must be brought to a carrier managed P GW, irrespective of desired destination. Depending on the desired destination, the P GW then simply routes the traffic, tunnels it to a different endpoint or makes it go through a processing chain before sending it to desired destination. As mobile traffic continues to grow, data is forced through unnecessary paths and hops, leading to inefficiency.

Such inefficiencies can be highlighted with the following examples.

1) Local data source or content delivery network (CDN)—in contrast to a fixed network where the domain name system (DNS) resolution at the first hop broadband remote access server (BRAS) leads to the nearest resource, the mobile network does public DNS resolution only at a P-GW which, depending on its location, may send a resolved address from a resource near the P-GW (best case scenario) or even further in the network. It should be noted that a resource near the P-GW could still be very far from the mobile user.

2) Corporate Access Point Network (APN) Typically mobile access to a corporate network is provided by allocating a dedicated APN to the given corporation. The dedicated APN points to a specific P GW within the mobile network which maintains connectivity to the corporate demilitarized zone (DMZ). Typically this connectivity is provided by a dedicated point to point connection over a L2 or L3 network such as Frame Relay, Multiprotocol Label Switching (MPLS), Layer 2 Tunneling Protocol (L2TP), Generic Routing Encapsulation (GRE) and Internet Protocol Security (IPsec). Given the complexity of the arrangement, dedicated corporate APNs are expensive and are used only by very large corporations. Given that a P GW may be required to support many types of tunneling, it increases cost and complexity of the P GW itself. Aside from being expensive, it is also inefficient since mobile access even from a corporate campus has to first travel to the P GW and then come back.

3) Lack of Security in GTP protocol—Neither the establishment of a GTP tunnel nor the content of a GTP tunnel are secure. Even though GTP is IP-in-IP tunneling protocol, in order to secure it, it needs to be encapsulated in IPsec, which is another IP-in-IP tunneling protocol, adding to the overhead. Moreover, this approach lacks any segment-based security, i.e. once a network is compromised, the GTP session can be established with nodes without any further checking.

SUMMARY OF THE INVENTION

Embodiments according to the present invention when a user equipment (UE) provides a new request to an S-GW, the S-GW augments DNS requests and provides them to a public DNS, with the augmentation providing indications of the requested function. The public DNS responds to the augmented DNS request by providing the IP address of a simplified or Lite P-GW close to the location of the requesting UE. The Lite P-GW will forward communications to the nearest endpoint providing the requested service or function. This allows the data path from the UE to the desired endpoint to be more direct by avoiding requiring using a dedicated P-GW in a remote network because of the need to use a dedicated DNS function. The UE is connected to the closest of a series of mirror locations for the endpoint, rather than a mirror that is located close to the remote P-GW. In embodiments, some of the functions of the P-GW are shifted to other devices in the mobile core, devices that are already local. The simplification of the P-GW to a Lite P-GW allows the P-GW to be more easily virtualized and thus moved to a general-purpose server location. Existing information present in the data path is used to provide encryption of portions of the GTP connection, specifically the inner IP packets, further allowing the location of the P-GW to be optimized in a virtual server data center rather than a mobile core facility, as the data path is now secure.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Embodiments according to the invention exploit the virtualization of mobile functions and the ability to locate them anywhere that is efficient traffic wise. The embodiments provide a method for deterministically locating a GTP endpoint based on public DNS resolution of a resource being requested by the mobile user. Finally, embodiments augment existing functions to provide security of the GTP connections.

In a traditional implementation, a P-GW is a specialized and expensive node and can be located only in a few places. According to this invention, the GTP termination aspect of a P-GW is virtualized and can be implemented as an application anywhere there is a general purpose computing resource available.

In a traditional mobile network, determination of a P-GW is a strictly private affair, done through a static table look up or through private DNS resolution of an APN. In embodiments according to this invention, the public DNS is queried with an augmented fully qualified domain name (FQDN) constructed as "APN"+"Destination FQDN". For example, if a mobile user is looking to access Netflix using an Internet APN of the mobile network the public DNS server is queried for "Internet.mobilenetwork"+"Netflix.com", where "Internet.mobilenetwork" augments the conventional "Netflix.com".

The resolution by the public DNS of such an augmented FQDN points to a GTP termination point near the Netflix server with the desired content.

The IP address allocation function of a P-GW is independent of the GTP termination function, and according to this invention, it can be co-located or could be located separately.

Similarly, in the case of mobile access for corporate networks, the augmented FQDN can be constructed as "Corp.mobilenetwork" +"corporate's FQDN". The resolution of this augmented FQDN by the public DNS server points to a GTP termination application in the corporate network. Therefore, there is no need for complex tunneling schemes from the mobile network to the corporate network.

The charging function, policy enforcement function and lawful intercept functions of a P-GW can be relocated to an S-GW or eNB if required.

Figure 1:
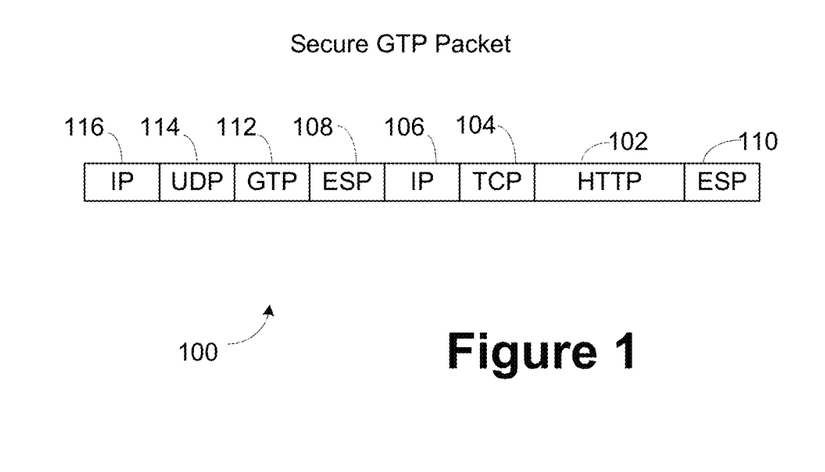
FIG. 1 is a drawing of a secure GTP packet according to the present invention.

Embodiments according to this invention include a system and method for securing the GTP packets. The added security function derives a security key from encryption keys present at the eNB or Mobility Management Entity (MME), which are developed as part of the normal security procedures for the devices. The invention uses GTP control signaling to exchange the intent to encrypt the data by way of a new GTP message or inclusion of the intent to encrypt in an existing message. Since GTP is an IP in IP tunneling scheme, embodiments according to the invention encrypt the inner packet as per the IPsec Request for Comments (RFC) and rewrites the outer GTP header for increased packet size and additional headers. This is shown in FIG. 1. A secure GTP packet 100 is illustrated. The HTTP message 102, or other message being transported, forms the basic payload, with TCP 104 and IP 106 headers attached to the HTTP message 102. An encapsulating security payload (ESP) header 108 and ESP trailer 110 are added per RFC 4303 or the like to the IP header 106, TCP header 104 and HTTP message 102 after they have been encrypted. A GTP header 112 is added, then a UDP header 114 and finally an outer IP header 116 to form the secure GTP packet 100. Thus, the HTTP message packet consisting of the HTTP message 102, the TCP header 104 and the inner IP header 106, is encrypted, has the ESP header 108 and ESP trailer 110 added and that combination is encapsulated in a GTP header 112, a UDP header 114 and an outer IP header 116.

Figure 2:
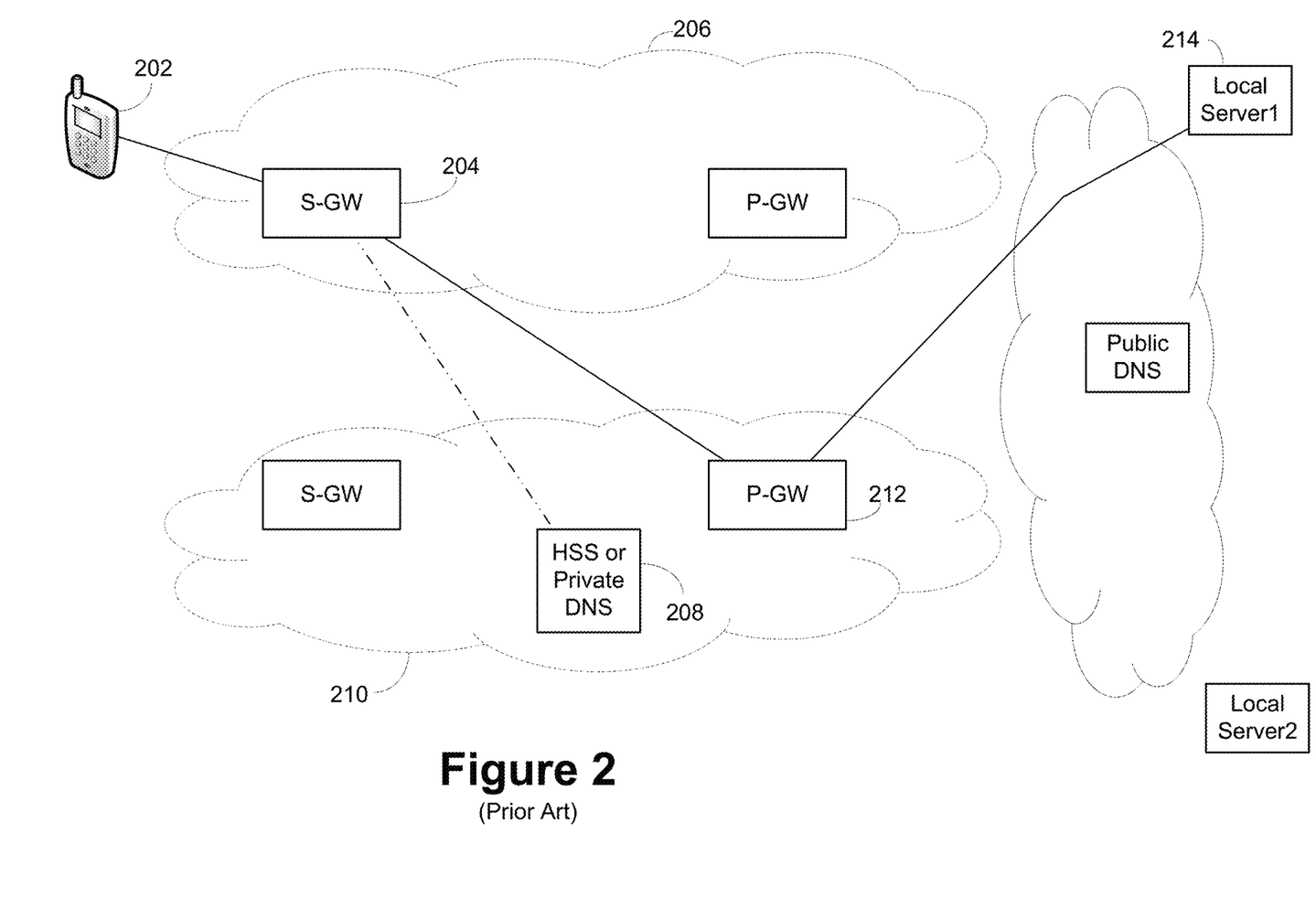
FIG. 2 is a block diagram of the mobile core according to the prior art.

FIG. 2 illustrates operation according to the prior art. A UE 202 is traveling and connects to an S-GW 204 in a remote network 206. The S-GW 204 queries either a Home Subscriber Server (HSS) or a private DNS 208 of a home network 210 and obtains the IP address of a P-GW 212, which is in the home network 210. The UE data path then becomes remote S-GW 204 to home P-GW 212 to local servers 214.

Figure 3:
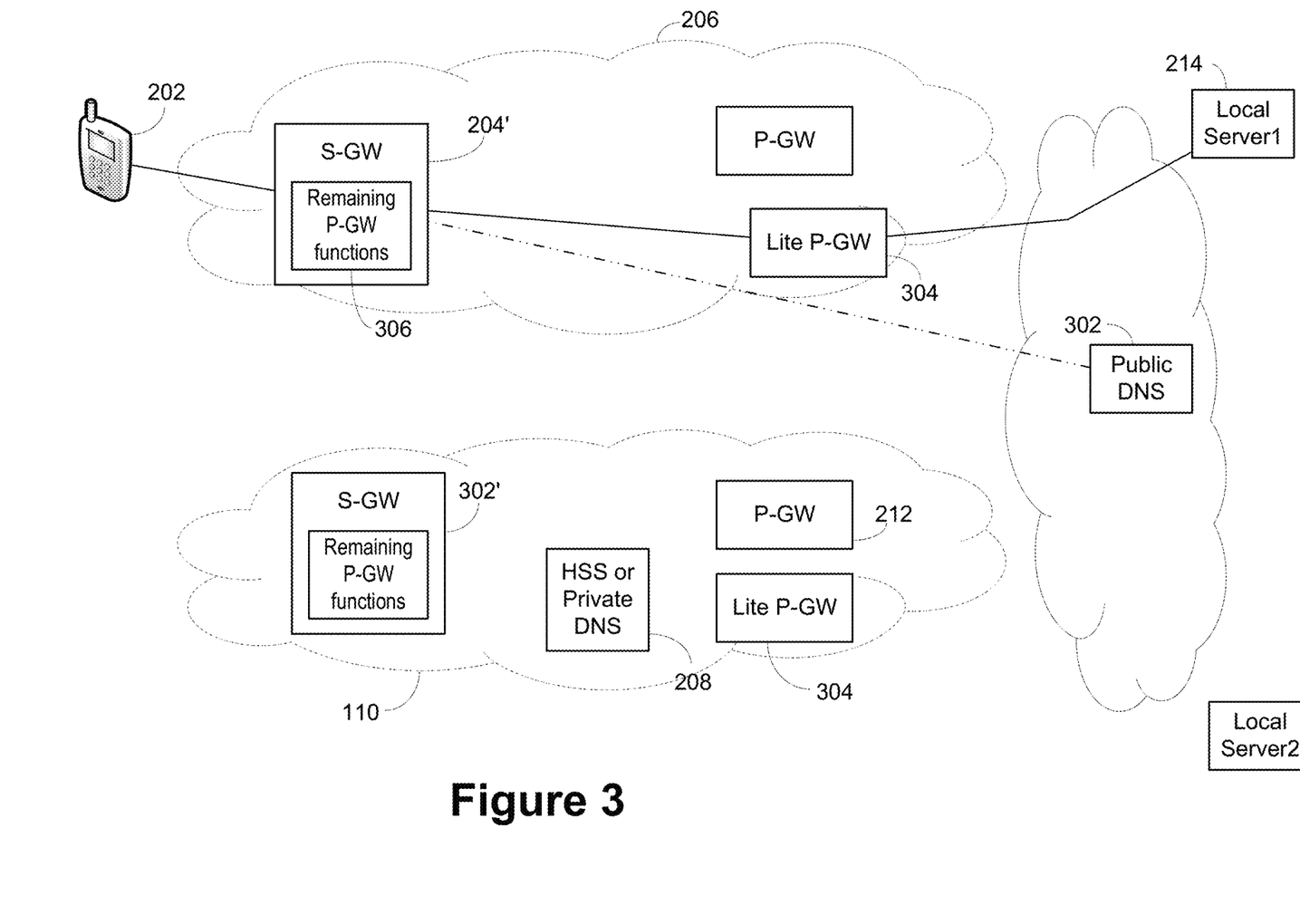
FIG. 3 is a first embodiment of the mobile core with connections to a UE and the Internet according to the present invention.

In FIG. 3, the UE 202 is still traveling, but embodiments according to the present invention have the S-GW 204' query a public DNS 302 with an augmented string such as "Internet.mobilenetwork" +"Netflix.com". Noting the "Internet.mobilenetwork" augmentation, the public DNS 302 returns the IP address of a Lite P-GW 304 close to the UE 202 and to the intended servers 214. The S-GW 204' further provides a location value in the query. As a default the S-GW 204' can include its own location, on the assumption that the UE 202 is close to the S-GW 204'. Alternatively, the S-GW 204' can query the UE 202 for its location and then include that more specific location in the query. As discussed above, the Lite P-GW 304 is preferably a virtualized device located in a convenient location that can perform GTP termination and thus pass packets to a PDN such as the Internet. If P-GW functions beyond just GTP termination are needed, the S-GW 204' can perform them as shown by the remaining P-GW functions block 306 in the S-GW 204'. These remaining P-GW functions include charging and policy enforcement. Thus, the UE 202 has a much shorter path to the local server closest to itself.

Figure 4:
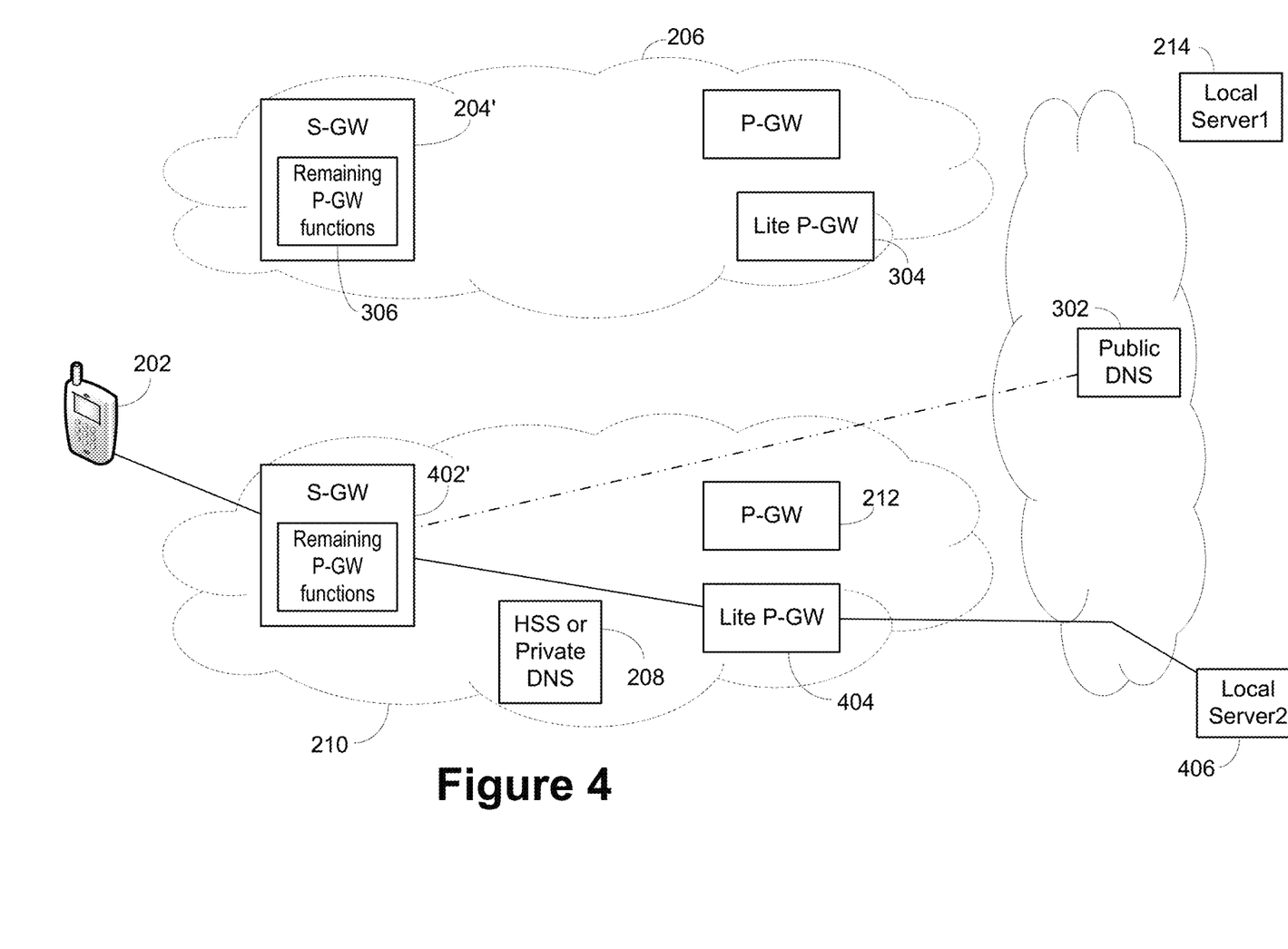
FIG. 4 is a second embodiment of the mobile core with connections to a UE and the Internet according to the present invention.

FIG. 4 illustrates operation when the UE 202 is in the home network 210. Again, a S-GW 402' queries the public DNS server 302 to obtain the closest Lite P-GW available. This results in the IP address to a Lite P-GW 404 in the home network 210 and its connection to local server2 406, a mirror of local servers 214. Thus operation is the same whether traveling or at home.

Figure 5:
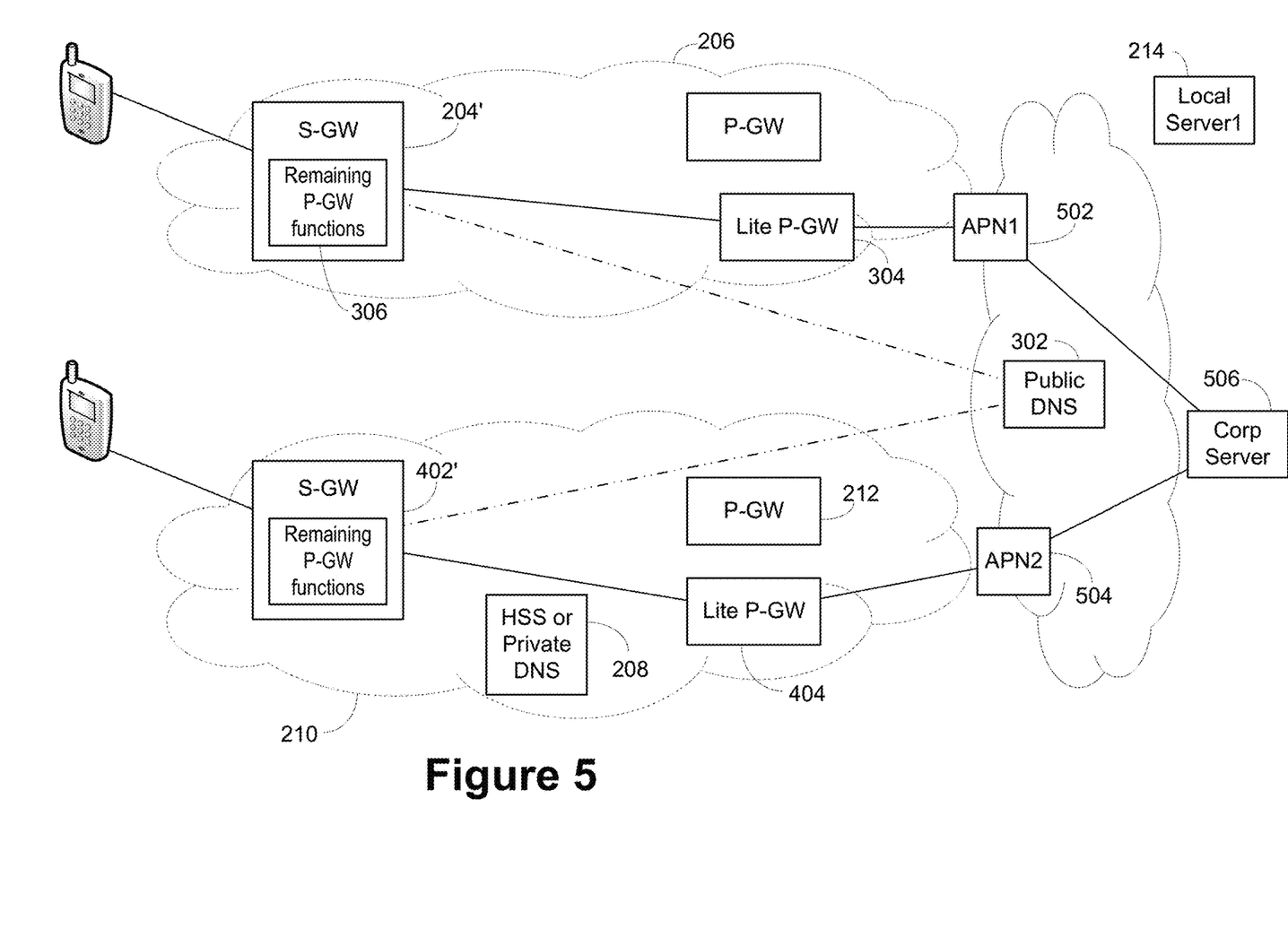
FIG. 5 is a third embodiment of the mobile core with connections to UEs and corporate network access points according to the present invention.

FIG. 5 illustrates operation with corporate gateways or APNs. In the illustrated case there are two APNs, APN1 502 and APN2 504, at different locations. The query is made to the public DNS 302 with an augmented string such as "Corp.mobilenetwork"+"corporate's FQDN". The public DNS 302 returns the closest Lite P-GW 304, 404, which then connects to the APN 502, 504 instance closest to itself. The APNs 502, 504 connect to a corporate server 506.

FIGS. 3-5 illustrate the Lite P-GW as being deployed in the mobile core, with the public DNS being in the public network. In an alternate embodiment, the Lite P-GW is deployed in the public network as well. As a Lite P-GW is acting a secure termination point, any transmissions with an S-GW are secure and any transmissions with servers or APNs are assumed public, so a Lite P-GW can be located in the public network if that provides a better flow or cheaper deployment by co-deploying with another element such as an APN.

Figure 6:
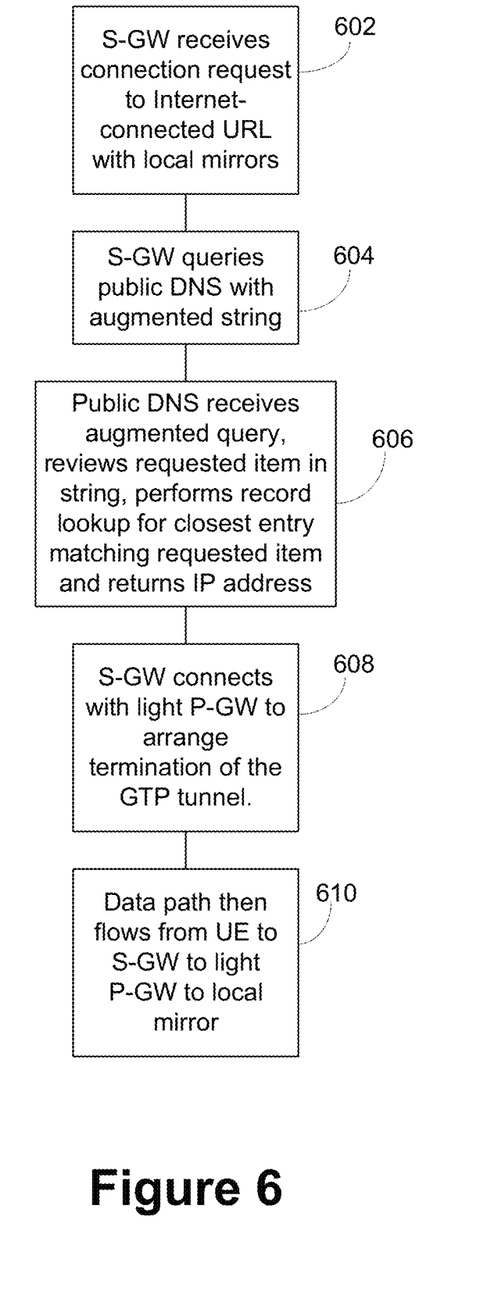
FIG. 6 is s flowchart of operation according to the present invention.

FIG. 6 is a sample flowchart of the operation described above. In step 602, an S-GW receives a connection request for an Internet-connected uniform resource locator (URL) which has local mirrors. In step 604, the S-GW queries the public DNS with an augmented FQDN, the augmentation indicating the desired function and source, such as "Internet.mobilenetwork" and a location value. In step 606, the public DNS receives the augmented query; reviews the requested items in the string, both the augmented portion and the normal FQDN; performs a record lookup for the closest or nearest entry matching the requested item and location indication and returns the IP address. Preferably, the query is an A or AAAA record or DNS query and the A and/or AAAA records in the DNS have been extended to include both the network portion and the specific resource being requested. A compliant DNS thus includes not only multiple A and/or AAAA records, but also multiple records for each resource and network combination supported. For example, there is an A record entry for each server connected to the Internet and provided to operate with mobile network devices for the given basic FQDN, such as a Netflix.com server in New York, in Texas and in California, resulting in three A records for "Internet.mobilenetwork"+"Netflix.com", one for each location, with the location value also known. In step 608, the S-GW contacts the Lite P-GW at the IP address with a request to terminate a GTP tunnel with the S-GW. In step 610, the data then flows from the requesting UE to the S-GW to the Lite P-GW to the designated local mirror for the Lite P-GW.

Figure 7:
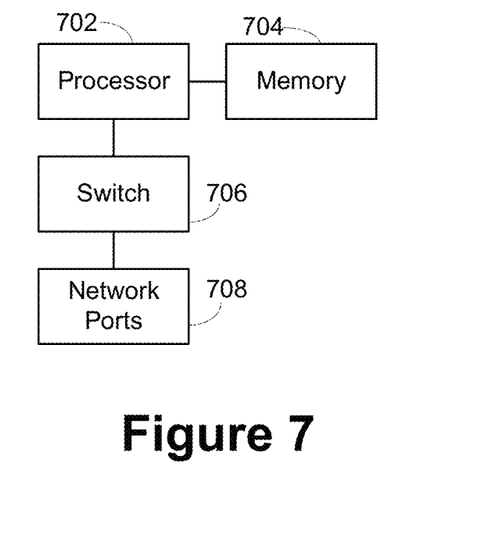
FIG. 7 is a block diagram of an S-GW or P-GW.

As known to one skilled in the art and shown in FIG. 7, S-GWs and P-GWs are complicated and expensive computer systems and packet routers, which include a processor 702, network interfaces or ports 708, a packet switch 706 for packet routing and a memory 704 to store programs and data. The operations, such as those described here and particularly in FIG. 6, are performed by programs stored in the memory and executing on the processor. The public DNS is similarly a complicated and expensive computer system, which includes a processor, network interfaces and a memory to store programs and data, the programs executing on the processor to perform the public DNS functions, particularly when augmented as described herein. Because the structure and operation of an S-GW, a P-GW and a public DNS are so well known, further details of their construction, configuration and operation are not provided here.

Therefore, by augmenting the records maintained in the public DNS to include items needed to allow indication of IP addresses for devices, such as servers or APNs, that perform functions specified in the augmentation, roaming UEs can be connected to more geographically desirable devices, devices which are closer than devices that would be indicated based on a look up by a dedicated or private name server. Further, the necessary functions of the P-GW are reduced, so the P-GW can become a simplified virtualized device located as desired, with certain legacy functions transferred to other devices, such as an eNB or S-GW, in the data path. Utilizing information already present in the mobile core, the various GTP connections inside the mobile core are secured using encryption.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of operating a mobile communication network, comprising:
   receiving, at a serving gateway (S-GW), a request from a user equipment (UE) to access a network resource;
   preparing, at the S-GW, in response to the received request, an augmented domain name server (DNS) request, the augmentation indicating a predefined function of the request;
   providing, by the S-GW, the augmented DNS request to a public DNS located on a public network;
   receiving, at the S-GW, from the public DNS an Internet Protocol (IP) address of a closest packet data network (PDN) gateway (P-GW) to the UE based on the augmented DNS request; and
   connecting, by the S-GW, to the P-GW at the received IP address, to develop a flow path from the UE to the S-GW to the closest P-GW.

2. The method of claim 1, wherein the S-GW and the P-GW are in a same network.

3. The method of claim 1, further comprising:
   performing, by the S-GW, at least one of a charging function, a policy enforcement function and a lawful intercept function on behalf of the P-GW.

4. The method of claim 1, wherein the step of connecting to the P-GW at the received IP address uses a secure GPRS Tunneling Protocol (GTP) format.

5. The method of claim 4, wherein the secure GTP format comprises:
   an encrypted message packet with added ESP header and ESP trailer which is encapsulated in a GTP header, a UDP header and an IP header.

6. The method of claim 1, wherein the augmented DNS request is in the form of an augmented function concatenated with a fully qualified domain name (FQDN).

7. The method of claim 6, wherein the augmented function includes a predefined resource and network type.

8. A serving gateway (S-GW) of a mobile communication network, comprising:
   a processor;
   a plurality of network ports coupled to the processor;
   a packet routing mechanism connected to the plurality of network ports and coupled to the processor; and
   a memory coupled to the processor and storing programs for execution on the process to cause the processor to:
      prepare an augmented domain name server (DNS) request, the augmentation indicating a predefined function of the request in response to receiving a request from a user equipment (UE) to access a network resource;
      provide the augmented DNS request to a public DNS located on a public network; and
      connect to a packet data network (PDN) gateway (P-GW) at an IP address provided by the public DNS in response to the provided augmented DNS request, the IP address being of a closest P-GW to the UE, to develop a flow path from the UE to the S-GW to the closest P-GW.

9. The S-GW of claim 8, wherein the S-GW and the P-GW are in a same network.

10. The S-GW of claim 8, further comprising:
    perform at least one of a charging function, a policy enforcement function and a lawful intercept function on behalf of the P-GW.

11. The S-GW of claim 8, wherein the step of connecting to the P-GW at the received IP address uses a secure GPRS Tunneling Protocol (GTP) format.

12. The S-GW of claim 11, wherein the secure GTP format comprises:
    an encrypted message packet with added ESP header and ESP trailer which is encapsulated in a GTP header, a UDP header and an IP header.

13. The S-GW of claim 8, wherein the augmented DNS request is in the form of an augmented function concatenated with a fully qualified domain name (FQDN).

14. The S-GW of claim 13, wherein the augmented function includes a predefined resource and network type.

15. A mobile communication network comprising:
a serving gateway (S-GW) for communicating with a user equipment (UE) including:
a processor;
a plurality of network ports coupled to the processor;
a packet routing mechanism connected to the plurality of network ports and coupled to the processor; and
a memory coupled to the processor and storing programs for execution on the process to cause the processor to perform various methods; and
a plurality of packet data network (PDN) gateways (P-GWs), the P-GWs being varying distances from the UE,
wherein various methods performed by the S-GW processor include:
preparing an augmented domain name server (DNS) request, the augmentation indicating a predefined function of the request, in response to receiving a request from the (UE) to access a network resource;
providing the augmented DNS request to a public DNS located on a public network; and
connecting to one of the plurality of P-GWs at an IP address provided by the public DNS in response to the provided augmented DNS request, the IP address being of a closest P-GW to the UE, to develop a flow path from the UE to the S-GW to the closest P-GW.

16. The network of claim 15, wherein the S-GW and the P-GW are in a same network.

17. The network of claim 15, the various methods further including:
performing at least one of a charging function, a policy enforcement function and a lawful intercept function on behalf of the P-GW.

18. The network of claim 15, wherein connecting to the P-GW at the received IP address uses a secure GPRS Tunneling Protocol (GTP) format.

19. The network of claim 18, wherein the secure GTP format comprises:
an encrypted message packet with added ESP header and ESP trailer which is encapsulated in a GTP header, a UDP header and an IP header.

20. The network of claim 15, wherein the augmented DNS request is in the form of an augmented function concatenated with a fully qualified domain name (FQDN).

21. The network of claim 20, wherein the augmented function includes a predefined resource and network type.

22. The network of claim 15, wherein at least one of the plurality of P-GWs is a virtual P-GW.

23. The network of claim 22, wherein at least one of the plurality of virtual P-GWs is located in the public network.

24. The network of claim 15, wherein the P-GW includes:
a processor;
a plurality of network ports coupled to the processor;
a packet routing mechanism connected to the plurality of network ports and coupled to the processor; and
a memory coupled to the processor and storing programs for execution on the process to cause the processor to communicate with a closest of a plurality of servers or a plurality of access point networks (APNs) located in the public network, with at least one server being closer to and one server being farther from the P-GW or with at least one APN being closer to and one APN being farther from the P-GW.

* * * * *